(12) United States Patent
Flynn et al.

(10) Patent No.: US 11,477,304 B2
(45) Date of Patent: Oct. 18, 2022

(54) CONVERSION TO AN INTERNET PROTOCOL STREAM

(71) Applicant: Hewlett-Packard Development Company, L.P., Spring, TX (US)

(72) Inventors: Thomas Joseph Flynn, Spring, TX (US); Christoph J. Graham, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/959,161

(22) PCT Filed: Jan. 30, 2018

(86) PCT No.: PCT/US2018/015942
§ 371 (c)(1),
(2) Date: Jun. 30, 2020

(87) PCT Pub. No.: WO2019/151986
PCT Pub. Date: Aug. 8, 2019

(65) Prior Publication Data
US 2020/0358870 A1    Nov. 12, 2020

(51) Int. Cl.
*H04L 67/565* (2022.01)
*G06F 9/455* (2018.01)
*H04L 67/75* (2022.01)

(52) U.S. Cl.
CPC ........ *H04L 67/565* (2022.05); *G06F 9/45558* (2013.01); *H04L 67/75* (2022.05); *G06F 2009/45579* (2013.01); *G06F 2009/45595* (2013.01)

(58) Field of Classification Search
CPC . H04L 67/2823; H04L 67/36; G06F 9/45558; G06F 2009/45579; G06F 2009/45595
See application file for complete search history.

(56) References Cited

U.S. PATENT DOCUMENTS 8,443,364 B2 *   5/2013   Imada ................. G06F 9/45533
                                                               718/1
8,539,025 B2    9/2013   Husain et al.
(Continued)

FOREIGN PATENT DOCUMENTS

CN           102523264           6/2012

OTHER PUBLICATIONS

Lia et al., "LiveRender: A Cloud Gaming System bgaed on Compressed Graphics Streaming", IEEE/ACM Transactions on Networking, vol. 24, No. 4, Aug. 2016, IEEE Publishing.*
(Continued)

*Primary Examiner* — Todd L Barker
(74) *Attorney, Agent, or Firm* — Brooks Cameron & Huebsch PLLC (57) ABSTRACT

Example implementations relate to conversion to an Internet Protocol stream. An example method includes capturing, at a device driver level of a virtual machine, a component for which to provide remote access. The example method further includes converting the component to an Internet protocol stream and providing, independently of an operating system of the VM, the remote access to a display device using the IP stream.

15 Claims, 9 Drawing Sheets

(56) References Cited

U.S. PATENT DOCUMENTS

| | | | | |
|---|---|---|---|---|
| 8,661,360 | B2* | 2/2014 | Jeong | G06F 3/0482 |
| | | | | 715/767 |
| 8,861,875 | B1* | 10/2014 | Doucette | H04N 19/103 |
| | | | | 382/232 |
| 10,452,570 | B1* | 10/2019 | Liguori | G06F 9/45558 |
| 11,265,362 | B1* | 3/2022 | Tabacco | H04L 67/131 |
| 2009/0070404 | A1 | 3/2009 | Mazzaferri | |
| 2010/0138744 | A1 | 6/2010 | Kamay et al. | |
| 2010/0303146 | A1 | 12/2010 | Kamay | |
| 2013/0084959 | A1* | 4/2013 | Nelson | G07F 17/3244 |
| | | | | 463/43 |
| 2013/0204927 | A1 | 8/2013 | Kruglikov et al. | |
| 2014/0053090 | A1 | 2/2014 | Lu et al. | |
| 2015/0067672 | A1* | 3/2015 | Mitra | G06F 9/5077 |
| | | | | 718/1 |
| 2015/0106814 | A1* | 4/2015 | Vilke | G06F 9/45558 |
| | | | | 718/1 |
| 2015/0222533 | A1* | 8/2015 | Birrittella | H04L 45/74 |
| | | | | 370/392 |
| 2016/0078585 | A1* | 3/2016 | Sheldon | G06F 9/45558 |
| | | | | 345/520 |
| 2016/0105489 | A1* | 4/2016 | Llorca | G06F 9/50 |
| | | | | 709/226 |
| 2017/0079033 | A1* | 3/2017 | Lin | H04W 72/1252 |
| 2017/0208125 | A1* | 7/2017 | Jai | G06F 3/0608 |
| 2017/0357528 | A1* | 12/2017 | Puranik | H04L 67/10 |
| 2018/0012569 | A1* | 1/2018 | Yoon | G06F 3/1415 |
| 2018/0260351 | A1* | 9/2018 | An | G06F 13/4282 |
| 2018/0262388 | A1* | 9/2018 | Johnson | H04L 63/0823 |
| 2018/0262550 | A1* | 9/2018 | Wasnik | H04L 67/12 |
| 2018/0295375 | A1* | 10/2018 | Ratner | G06T 7/136 |
| 2019/0220328 | A1* | 7/2019 | Rosenboom | G06F 8/38 |

OTHER PUBLICATIONS

Cuervo et al., "Kahawai: High-Quality Mobile Gaming Using GPU Offload", Proceedings of the 13th Annual international Conference on Mobile Systems, Applications, and Services, May 2015, ACM Digital Library.*

Hadzic et al., "Building Media-Rich Cloud Services from Network-Attached I/O Devices", 2016 IEEE 4th International Conference on Future Internet of Things and Cloud (FiCLoud), pp. 41-49, IEEE Publishing, Aug. 2016.*

Celesti et al., "Improving Desktop as a Service in OpenStack", 2016 IEEE Symposium on Computers and Communication (ISCC), pp. 281-288, IEEE Publishing, Jun. 2016.*

Blitstein, Patrick. "What Is Zero Client Computing for Desktop Virtualization?" Oct. 11, 2010, Available at: https://www.youtube.com/watch?v=Gxx0tAUTrvl.

Teradici. "PCoIP technology—three essential features." Aug. 24, 2013. Available at: https://www.youtube.com/embed/y2YjlXNWQ74?autoplay=1.

* cited by examiner

CONVERSION TO AN INTERNET PROTOCOL STREAM

BACKGROUND

Remote access can include connection to a data-processing system from a remote location, for example, through a Remote Access Service or virtual private network, Remote access can also include allowing applications to run remotely on a server while displaying graphical output locally.

DETAILED DESCRIPTION

People have a plurality of different devices, such as smartphones, tablets, personal computing devices, etc. on which they store things and use applications. The devices may have different operating systems (OSs) or other operating environments, which can complicate connection and communication between the devices, including remote access.

In some remote access approaches, specialized applications can be loaded into a hosting OS. These approaches can increase overhead from display conversion and encoding, specialized redirection for Universal Serial Bus (USB), printing, and serial devices, among others. The approaches can be intrusive to a hosted OS due to compression and compatibility. In such approaches, a special version of a sender application may be used for each OS release supported, and a receiver application may have to run on a plurality of OSes.

Examples of the present disclosure can allow for an OS-independent approach of providing remote access to a virtual machine (VM) by capturing components to remote at a device driver level in the VM and converting them to an Internet Protocol (IP) stream. The device driver level can include the area of the VM housing virtual device drivers. The IP stream can be received by a Micro-Controller Operating Systems (micro OS) at a display device in some examples. A micro OS is a priority-based preemptive real-time kernel for microprocessors. A micro OS can manage a plurality of tasks, and its size can be scaled to contain particular features for particular uses. In some instances, a VM can perform the inverse of the sending VM such that a plurality of OSes can be displayed on the display device, for instance if a VM is used on the display device in place of a micro OS.

As used herein, a display device can include a display surface (e.g., a piece of glass), a processing resource, a radio (e.g., a 5G radio), and/or a battery. The display device can also include an input, such as a keyboard or a touch screen. The display device can be a secure appliance that contains no user data. In some instances, the display device can include a micro OS. Examples of a display device can come in a plurality of form factors including, for instance, a smartphone, notebook, tablet, virtual reality device display (e.g., goggles), glasses, or other mobile computing device, among others.

Examples of the present disclosure can allow for the display device to run an OS without local storage and/or intrusive protocols or graphic compression. The OS may be unmodified and can be switched on-demand, in some examples. Examples can allow for compatibility with existing ecosystems, and connections can be secure such that hardware level security can be enforced at connection time and can be enhanced with user level security.

Examples of the present disclosure can also allow for reduction of data loss from a misplaced or stolen device. For instance, a lost smartphone may be replaced, and with the proper credentials, data can be retrieved from the smartphone via the display device.

Figure 1:
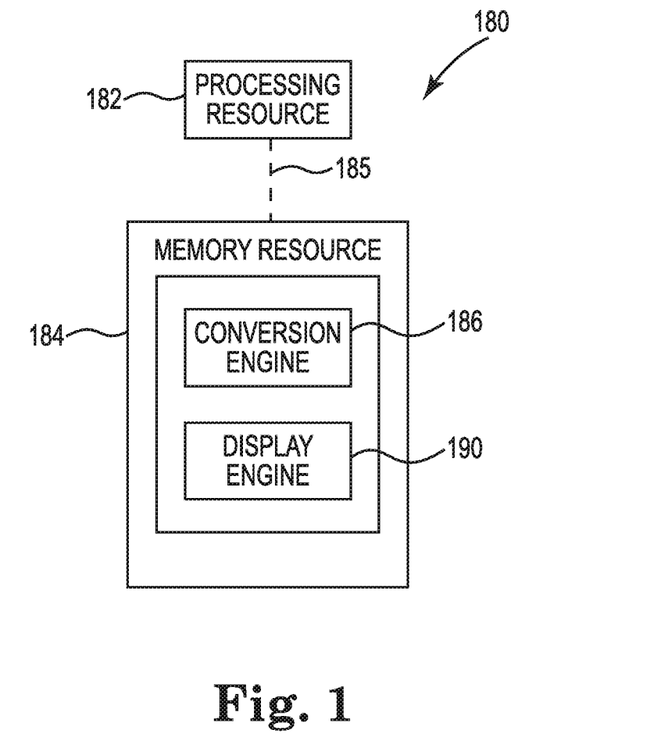
FIG. 1 illustrates a diagram of a controller including a processing resource, a memory resource, and engines according to an example.

FIG. 1 illustrates a diagram of a controller 180 including a processing resource 182, a memory resource 184, and engines 186 and 190 according to an example. For example, the controller 180 can be a combination of hardware and instructions for displaying to a display device output converted from components (e.g., device drivers) of a VM to an IP stream. The hardware, for example can include a processing resource 182 and/or a memory resource 184 (e.g., machine-readable medium (MRM), computer-readable medium (CRM), data store, etc.).

The processing resource 182, as used herein, can include a number of processors capable of executing instructions stored by a memory resource 184. The instructions (e.g., machine-readable instructions (MRI)) can include instructions stored on the memory resource 184 and executable by the processing resource 182 to implement a desired function (e.g., displaying to a display device output converted from components of a VM to an IP stream). The memory resource 184, as used herein, can include a number of memory components capable of storing non-transitory instructions that can be executed by processing resource 182. Memory resource 184 can be integrated in a single device or distributed across multiple devices. Further, memory resource 184 can be fully or partially integrated in the same device as processing resource 182 or it can be separate but accessible to that device and processing resource 182. Thus, it is noted that the controller 180 can be implemented on an electronic device and/or a collection of electronic devices, among other possibilities.

The memory resource 184 can be in communication with the processing resource 182 via a communication link (e.g., path) 185. The communication link 185 can be local or remote to an electronic device associated with the processing resource 182. The memory resource 184 includes engines (e.g., conversion engine 186 and display engine 190). The memory resource 184 can include more engines than illustrated to perform the various functions described herein.

The engines 186 and 190 can include a combination of hardware and instructions to perform a number of functions described herein (e.g., displaying to a display device output converted from components of a VM to an IP stream), The instructions (e.g., software, firmware, etc.) can be downloaded and stored in a memory resource (e.g., MRM) as well as a hard-wired program (e.g., logic), among other possibilities.

The conversion engine 186 can convert output from components of a VM to an IP stream using a virtual device driver of the VM, and display engine 190 can display to a display device the converted output using the virtual device driver. For instance, the outputs leaving the VM can be caught and packaged into an IP stream and sent to the display device. The IP stream can be received by a micro OS that decodes the IP stream and routes the correct element to the correct device for presentation to a user via the display device. In some instances, in place of a micro OS, a VM can be configured to do the inverse of the sending VM, allowing multiple OSes to be displayed on the same client.

In some examples, Universal Serial Bus (USB) output associated with the VM can be converted to the IP stream using the virtual device driver and/or sensor output associated with the VM can be converted to the IP stream using the virtual device driver. The IP stream, in some examples, can be communicated via a VM channel or port. A VM channel can be used for network traffic between different VMs in a server pool. The channel can be routable through standard switches or without a route to an external physical network, A VM port or group of ports can provide networking for VMs. VM port groups can create logical rules around VM ports made available to VMs.

Other outputs, such as outputs associated with running an OS associated with the VM can stay local. The display device can include a communication mechanism to catch the IP stream and display it. For example, component output can be caught by the display device, and display of the output can be executed. In some examples, the output can be converted independent of an operating system (OS) associated with the VM.

In some examples, to the display device, interpolation of the IP stream can be directly compatible with a component signal generated locally at the display device. For instance, to a receiving USB controller, signals provided by converted to the IP stream may appear indistinguishable with those of a locally-connected USB device.

Figure 2:
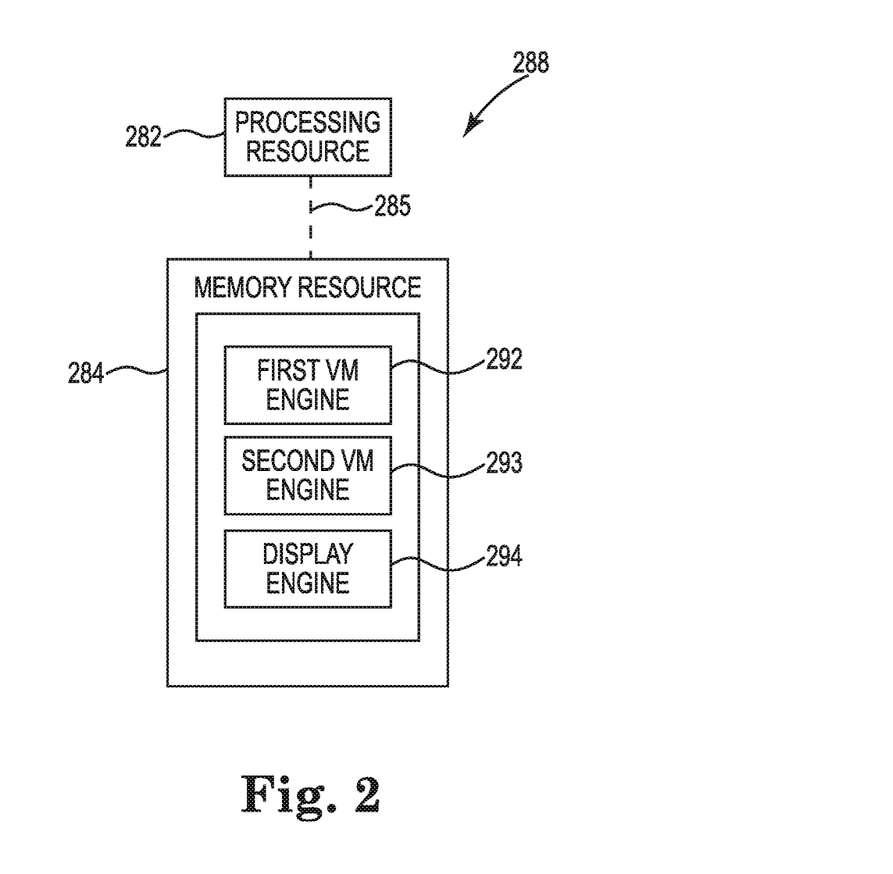
FIG. 2 illustrates a diagram of another controller including a processing resource, a memory resource, and engines according to an example.

FIG. 2 illustrates a diagram of another controller 288 including a processing resource 282, a memory resource 284, and engines 292, 293, and 294 according to an example. Similar to controller 180 illustrated in FIG. 1, controller 288 also includes a communication link (e.g., path) 285. In some examples, memory resource 284 can include more engines than illustrated to perform the various functions described herein.

First VM engine 292 can convert output from a first VM component associated with a first OS to an IP stream using a first virtual device driver, and second VM engine 293 can convert output from a second VM component associated with a second OS to the IP stream using the second virtual device driver. Display engine 294 can display to a display device, simultaneously and independently of the first and the second OSes, the converted first and second outputs using the first and the second virtual device drivers. For instance, two operating environments can be displayed on the display device simultaneously regardless of the original OSes. Said another way, output associated with two different OSes can be converted by the first and the second virtual device drivers and displayed simultaneously on the display device. In some examples, the converted first and second outputs using the first and the second virtual device drivers can be displayed independently of an OS associated with the display device.

Converting the output can include the virtual device driver receiving an IP packet and converting a display channel stream to match a physical display on the display device. In some examples, converting the output can include the virtual device driver receiving an IP packet and using a USB Hub channel (e.g., multi-directional) to convert a USB Hub stream to feed to/from an appropriate connected USB device. Converting the output can include the virtual device driver receiving an IP packet and converting sensor information to to/from an IP stream on a port or channel. Interpolation of these converted IP streams can be directly compatible with component signals locally generated at the display device. For instance, to a receiving USB controller, signals provided by the display device appear indistinguishable from those of a locally connected USB device.

In some examples, remote access of the controller can be provided to the display device using the IP stream. For instance, a user can log into a display device and access a device or a plurality of devices. For example, a user can log into the display device to view a lost smartphone simultaneously with a tablet left at work, regardless of the OSes of the devices. In some instances, the display device can include a VM (e.g., in place of a micro OS). In such an example, the remote access can be provided to the VM located on the display device.

In some instances, the IP stream can be compressed based on a condition of an associated 5G network. For example, to maintain desirable performance at the display device, the IP can be compressed (e.g., to increase conversion speeds).

Figure 3:
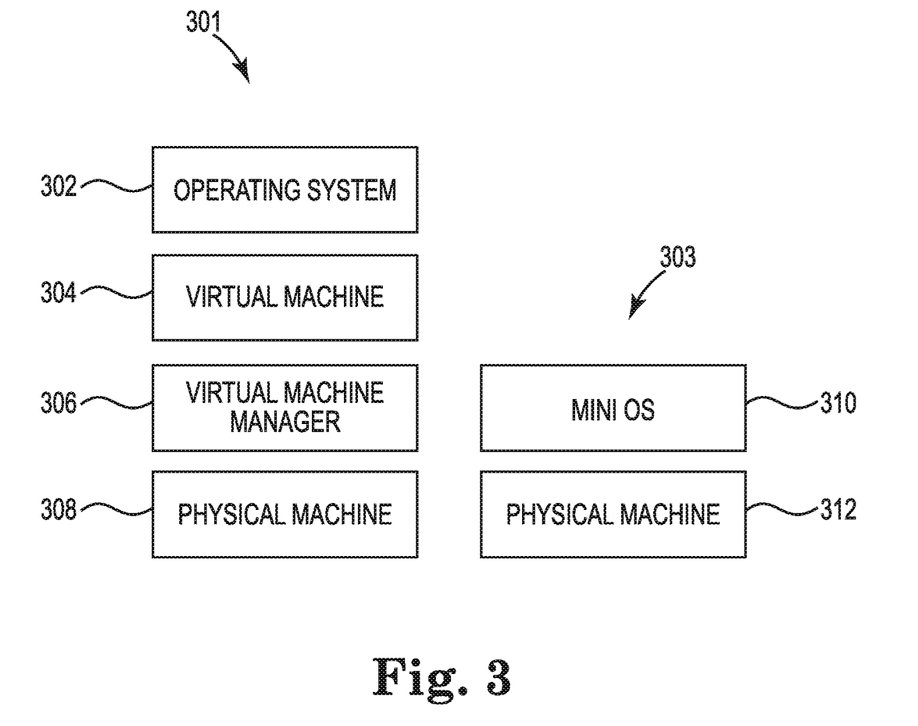
FIG. 3 illustrates a diagram of a server and a display device according to an example.

FIG. 3 illustrates a diagram of a server 301 and a display device 303 according to an example. The server 301 can include an OS 302, VM 304, VM manager 306, and a physical machine 308. OS 302 can operate above VM 304, which can capture outputs in an IP stream for sending to the display device 303. VM 304 can be managed by virtual machine manager, and the physical machine can include physical hardware such as memory, storage, NIC, etc., shared by VM 304 with other VMs.

The display device 303 can include a mini OS 310 and a physical machine 312. In contrast to approaches that include a full OS on the physical machine of a receiving device, the display device 303 can be a machine (e.g., appliance) that can render a display and interact with a hosted OS 302. Mini OS can function to display something via a display screen and capture incoming outputs from VM 304, among others. Physical machine 312 can include physical hardware such as memory, limited storage, a network interface controller (NIC), and sensors, among others. As noted above, a display device 303 can also include a radio and/or a processing resource.

Remote access according to the example illustrated in FIG. 3 may have little or no impact on sending OS 302. For instance, the OS 302 can be run without modification. Put another way, an application running on OS 302 can be placed in a virtualized world without modification and subsequently displayed on the display device 303 via mini OS 310. For example, physical machine can include a display to display the application and access can be provided to the application with a reduced impact on OS 302, which is sending the application. In such an example hardware-level security can be enforced at connection time, which can be enhanced with user-level security.

In contrast to other approaches where both a sending application and a receiving application are above their respective OSes such that the application runs on the inside of or on top of the OS, the example illustrated in FIG. 3 allows for a VM 304 running under OS 302, such that component outputs of the VM are caught by the VM manager and passed along to the display device 303. The outputs can be displayed on the display device 303 using the mini OS.

Figure 4:
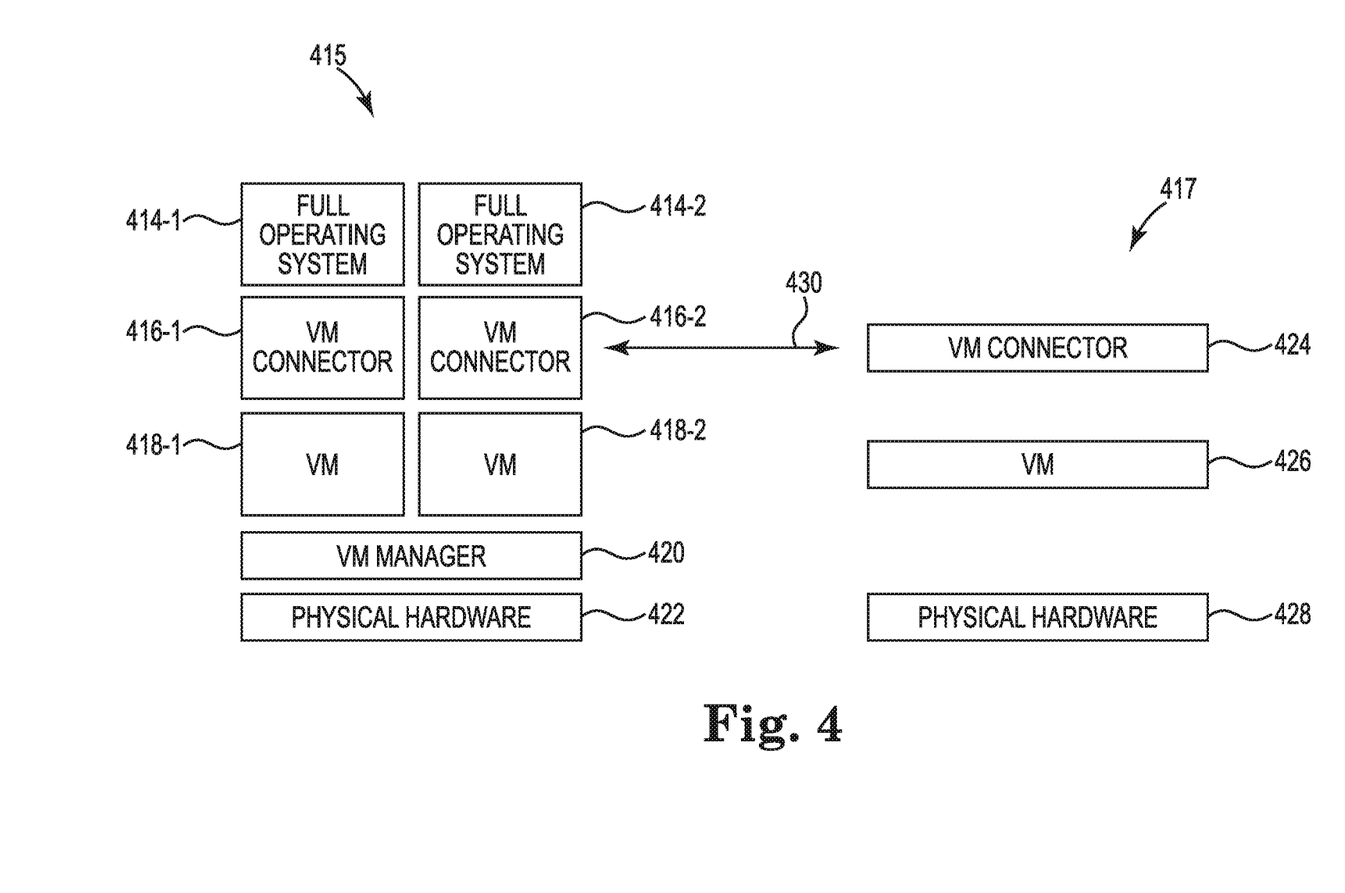
FIG. 4 illustrates another diagram of a server and a display device according to an example.

FIG. 4 illustrates another diagram of a server 415 and a display device 417 according to an example. FIG. 4 can be akin to FIG. 3 in some examples, but FIG. 4 includes two OSes 414-1, 414-2 on the server side. The server 415 also includes two VM connectors 416-1, 416-2, and two VMs 418-1, 418-2. VMs 418-1 and 418-2 can include a definition of what resources are available to the VM and what resources can be allocated and/or managed by VM manager 420. VM connectors 416-1, 416-2 allow for VM connections for interaction with OSes in VMs. The server 415 can further include VM manager 420 and physical hardware 422.

In the example illustrated in FIG. 4, the two OSes 414-1, 414-2 can run on the same server 415. The two OSes 414-1, 414-2 can be the same or different OSes (e.g., Windows, Linux, iOS, Android, etc.). In such an example, a display device 417 including VM connector 424, VM 426, and physical hardware 428 can display output from one or both OSes 414-1, 414-2 simultaneously while having little or no effect on either OS 414-1, 414-2. The server 415 and the display device 417 can be communicatively coupled via a logical connection 430 based on client attributes such as a virtual local area network (ULAN). As used herein, "communicatively coupled" can include coupled via various wired and/or wireless connections between devices such that data can be transferred in various directions between the devices. The coupling need not be a direct connection, and in some examples, can be an indirect connection. The display device 417 can include UM 426 and VM connector 424 in this instance, for example in place of a micro OS, such that UM can perform the inverse of VMs 418-1, 418-2, allowing a plurality (two in FIG. 4) operating environments to be displayed on the same display device 417.

In another example, two display devices can share a same experience in a collaborative manner. For instance, two different display devices can receive the same screen with two inputs coming from two sources. In such an example, the application can move regardless of the device.

Figure 5:
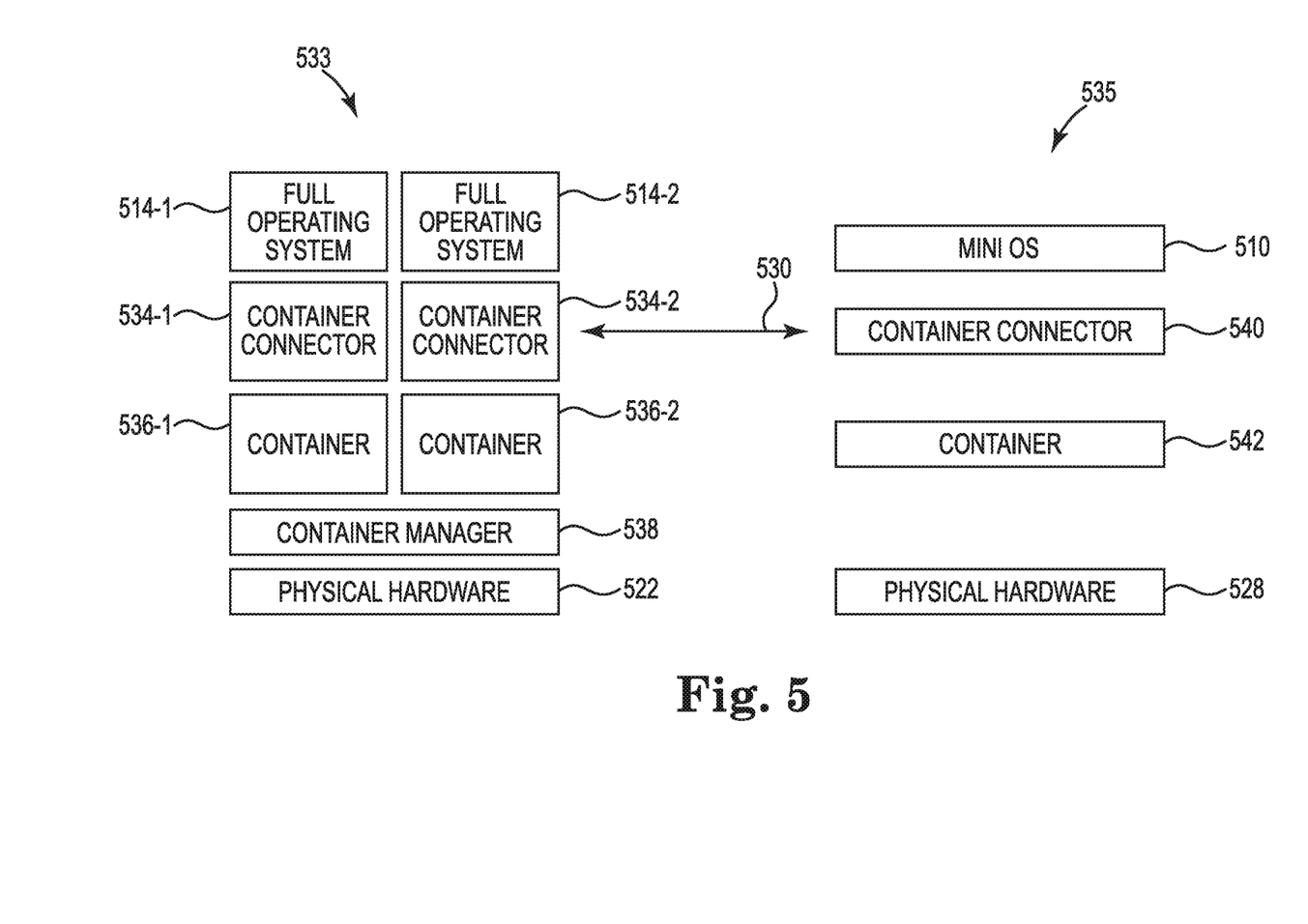
FIG. 5 illustrates yet another diagram of a server and a display device according to an example.

FIG. 5 illustrates yet another diagram of a server 533 and a display device 535 according to an example. FIG. 5 can be akin to FIG. 4 in that two OSes 514-1, 514-2 can be run on the same server 533. The server 533 illustrated in FIG. 5 may be a server commonly referred to as a "collection of containers." For instance, the server 533 can partake in containerization such that a kernel allows the existence of multiple isolated user-space instances called containers. The server 533 can include container connectors 534-1, 534-2, containers 536-1, 536-2, container manager 538, and physical hardware 522. Container connectors 534-1, 534-2, 540 can allow for container connections for interaction with OSes in containers, similar to VM connectors 416-1, 416-2, and 424 of FIG. 4.

The server 533 can be communicatively coupled to a display device 535 including a mini OS 510, container connector 540, container 542, and physical hardware 528. The communicative coupling, in this example, can include a logical connection 530 based on client attributes. In some examples, the OSes 514-1, 514-2 can run applications (e.g., running a desktop, running a phone, etc.), and this can be extended to containers 536-1, 536-2. The display device 535 can display both applications simultaneously. While two OSes are illustrated here, more than two applications (from the same or different OSes) can be displayed and connected to from the display device 535.

Figure 6:
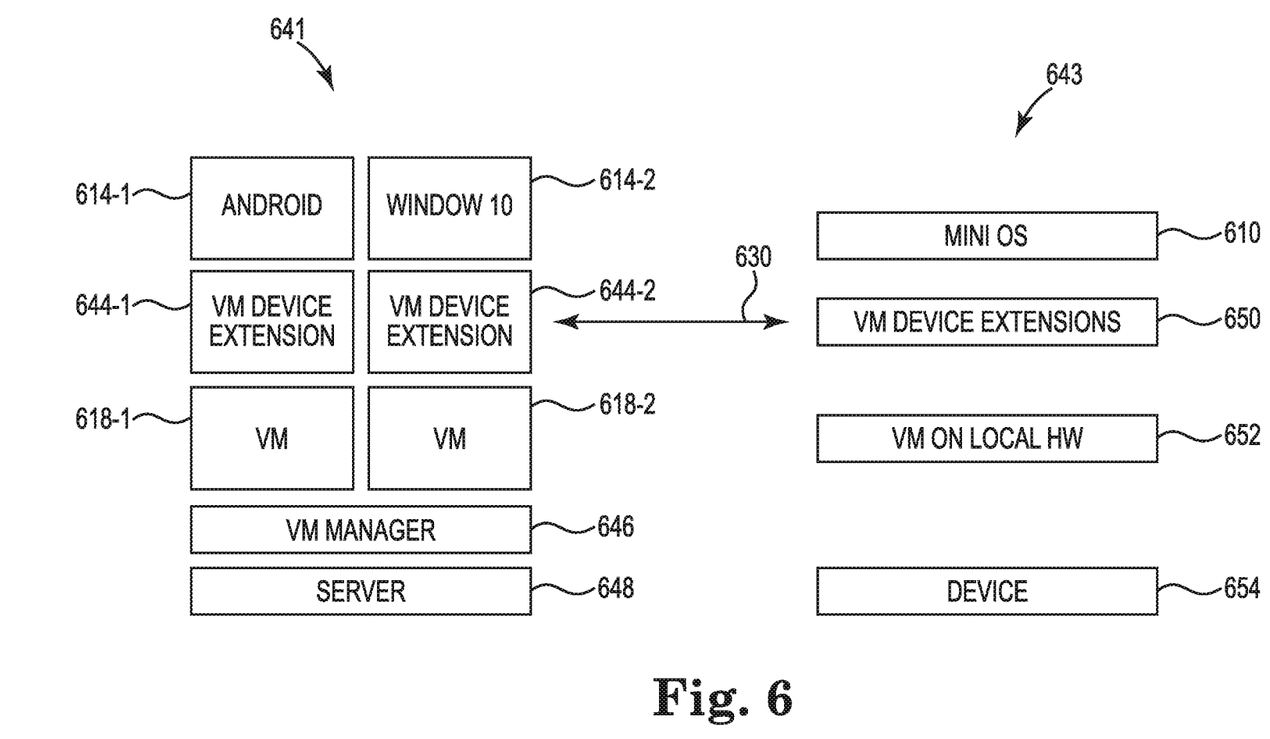
FIG. 6 illustrates yet another diagram of a server and a display device according to an example.

FIG. 6 illustrates yet another diagram of a server 641 and a display device 643 according to an example. FIG. 6 can be akin to FIGS. 4 and 5, such that two OSes 614-1, 614-2 (illustrated here as Android OS and Windows 10 OS) can be part of the server 641, as well as VM device extensions 644-1, 644-2, VMs 618-1, 618-2, virtual machine manager 646, and server 648. VM device extensions 644-1, 644-2, and 650 can be applications that provide post-deployment configuration and automation tasks on a VM, in some examples. For instance, if VMs 618-1, 618-2, or 652 are to undergo installation of an application or configuration, the respective VM device extension can perform the task.

The server 641 can be communicatively coupled to a display device 643 including a mini OS 610, VM device extensions 650, a VM on local hardware 652, and a device 654 such as a radio, processing resource (e.g., central processing unit), or display screen, among others. The communicative coupling can include a logical connection 630 based on client attributes. In such an example, the display device 643 can display output from one or both OSes 614-1, 614-2 simultaneously while having little or no effect on either OS 614-1, 614-2.

Figure 7:
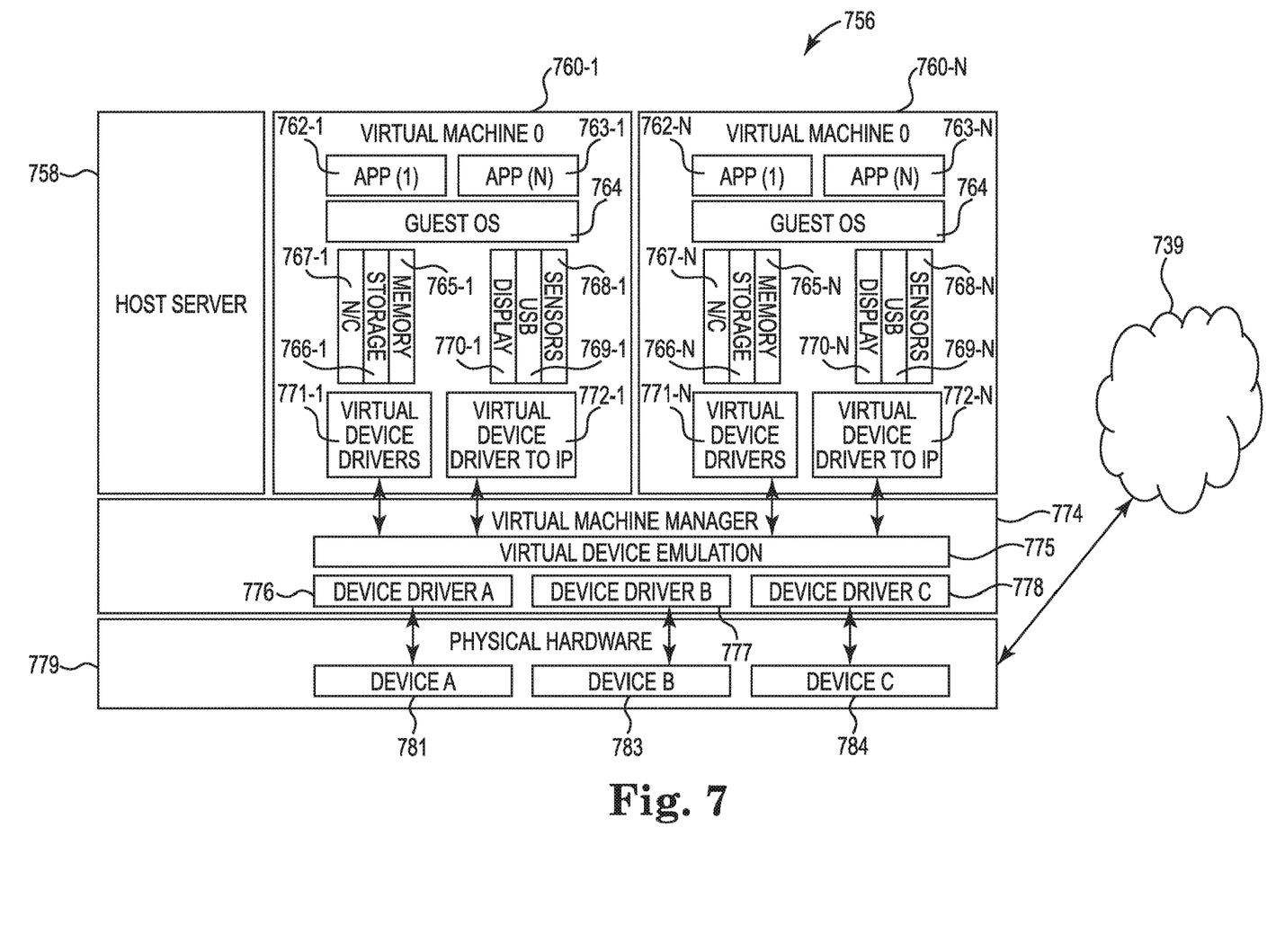
FIG. 7 illustrates a diagram of a server block according to an example.

FIG. 7 illustrates a diagram of a server block 753 according to an example. Server block 756 can include host server 758, a plurality of VMs 760-1, . . . , 760-n, a virtual machine manager 774, and physical hardware 779. Herein after analogous elements such as elements 760-1 and 760-n may be generally referenced without the hyphen and extra numeral or letter (e.g., 760). Each VM 760 can include applications 762, a guest OS 764, a memory component 765, a storage component 766, a network interface controller (NIC) 767, a display component 770, a USB component 769, and sensor components 768. While the aforementioned components are illustrated in FIG. 7, more or less, as well as different components can be present in VMs 760.

VMs 760 can further include virtual device drivers 771 and 772. Virtual device driver 771 can be internal to it's associated component (e.g., memory 765, NIC 767, storage 766), and virtual device driver 772 can communication external via an IP stream to a display device. Virtual device drivers 771, 772 can make up a device driver level of the VM.

In such an example, virtual device driver 772 can capture output (e.g., a packet) from sensor components 768, USB components 769, and/or display components 770 and send it over a network interface through physical hardware 779 (e.g., a physical hardware layer) to an endpoint (e.g., a display device). Put another way, output transformed and converted to an IP stream on a port or channel can be displayed to virtual device driver 772. The output can include USB 769 output to virtual USB device drivers or virtual USB device drivers to a USB hub to a virtual USB hub device driver converted to/from an IP stream on a port or channel. In some examples, the output can include output from sensors 769 to a virtual sensor driver converted to/from an IP stream on a port or channel.

Output sent via virtual device driver 771 or 772 can be received at virtual machine manager 774, and can undergo virtual device emulation at 775. Device drivers 776, 777, 778 can be emulated or synthetic and can facilitate communication between virtual hardware (e.g., within VMM 760) and devices 781, 783, and 784 within physical hardware 779. Devices 781, 783, 784 can include, for instance, memory, storage, NIC, etc. shared by the VMs 760 on server block 756. Within server block 756, sensor output, display output, USB output, etc. can be caught and converted to an IP stream external to an associated OS 764 and sent to a display device, in some examples, via cloud computing 739.

Figure 8:
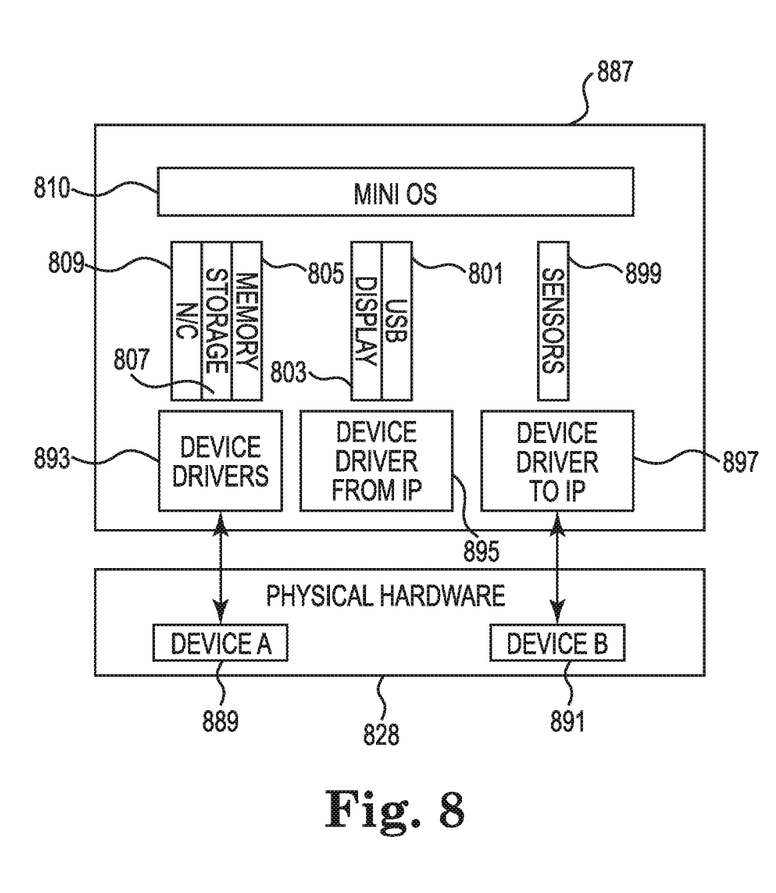
FIG. 8 illustrates a diagram of a display device server block according to an example.

FIG. 8 illustrates a diagram of a display device server block 887 according to an example. Server block 887 can include mini OS 810, memory component 805, storage component 807, NIC 809, a display 803, a USB port 801, and sensor components 899. While the aforementioned components are illustrated in FIG. 8, more, fewer, and/or different components may be present. Also included on server block 887 can be device drivers 893, 895, and 897. Device drivers 893 and 897 can be communicatively coupled to devices 889 and 891, respectively, housed on physical hardware 828.

Mini OS 810 can function as an operating environment for the display device server block 887, and each device driver 893, 895, 897 can handle its own components (e.g., NIC 809, storage 807, memory 805; USB 801, display 803; and sensors 899, respectively). Device driver 895 can be a device driver that receives output from an IP stream (e.g., an IP packet) coming from a VM, such that it can receive things for the USB 801 and display 803 components. Sensor components 899 (e.g., GPS, etc.) can send, via device driver 897 and the IP stream, information to the VM. Device driver 897 can convert sensor information to/from an IP stream on a port or channel. This can be done responsive to receipt of output at USB 801 and display 803 components in some instances. For instance, device driver 895 can convert an incoming IP stream to match a physical display of the display device and/or convert information to/from appropriate connected USB devices.

In some examples, local character and mouse echo can be applied based on latency. For instance, if latency reaches a threshold amount such that a user stops noticing things happening on the display device to the VM because latency is above human perception (e.g., 50 milliseconds or above), a perception of slowness may be experienced by the user. This can be addressed, in some instances, by echoing an action (e.g., such as typing) on the display device screen and sending it back to the VM simultaneously, such that the user does not have to wait for a round trip of the send to and from the VM before it is displayed.

Figure 9:
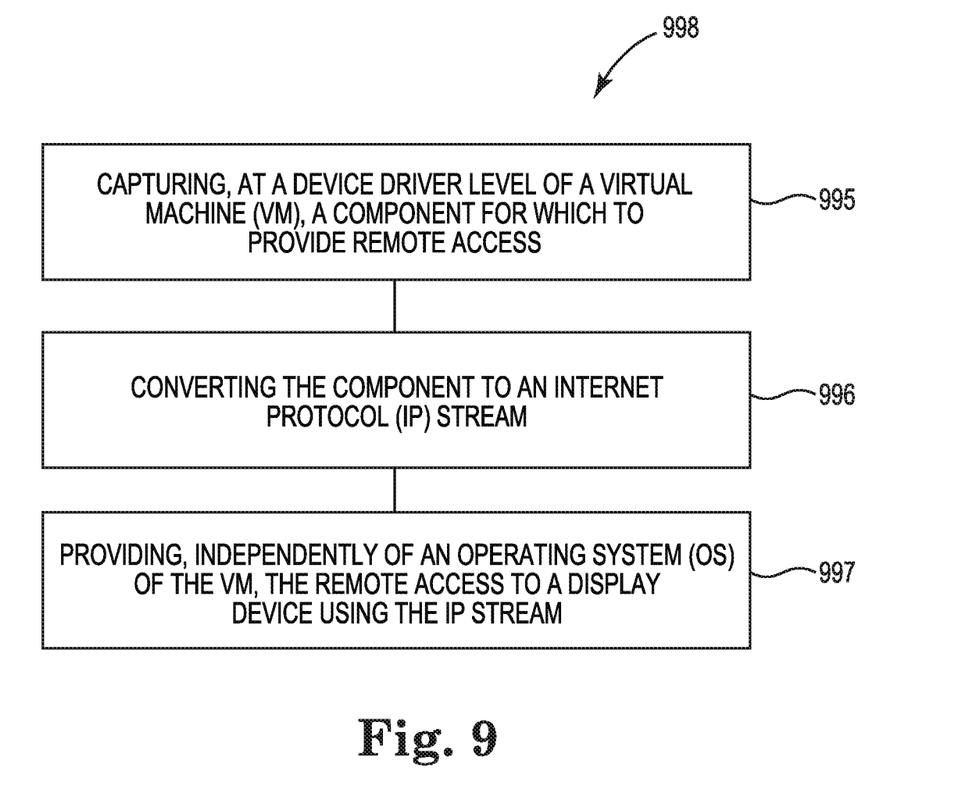
FIG. 9 illustrates a diagram of a method for providing remote access to a display device according to an example.

FIG. 9 illustrates a diagram of a method for providing remote access to a display device according to an example. Method 998, at 995 can include capturing, at a device driver level of a VM, a component for which to provide remote access. For instance, the component can include a display component, an USB component, and/or a sensor component, among others. At 996, method 998 can include converting the component to an IP stream. For instance, the display component and/or information associated with the display component can be converted to an IP stream using a virtual device driver. For example, graphics or functions from one infrastructure, such as an application designed for a keyboard, can be transposed to another, such as an application designed for a touch screen. Similar, USB and sensor components can be converted to an IP stream using the virtual device driver. While three specific components have been described herein, more or fewer components can be present.

At 997, method 998 can include providing, independently of an OS of the UM, the remote access to a display device using the IP stream. For instance, the display component information, USB component information, and/or sensor information can be displayed via the display device, regardless of the OS. In such an example, the information displayed via the display device can be indistinguishable from locally connected components based on the compatibility of the interpolation of the IP streams with locally generated component signals. The IP stream, in some examples, can be provided to a micro OS located on the display device.

Information can be received from the display device, in some instances, in response to providing the remote access to the display device. For example, the display device can have device drivers to receive information from the VM and in turn send information back to the VM (e.g., sensor information).

In some examples, the remote access can be provided via a UM channel and a 5G connection to the display device. For instance, a 5G radio can be present on the display device, allowing for a higher bandwidth, lower latency, and higher quality of service as compared to previous generation radios. In some examples, the remote access can be provided to the display device independently of an OS of the display device.

In some examples, method 998 can include receiving information from the display device in response to providing the remote access to the display device.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed is:

1. A method, comprising:
    capturing, at a device driver level of a first virtual machine (VM) made up of a plurality of virtual device drivers, a component for which to provide remote access;
    converting the component to an Internet protocol (IP) stream; and
    providing, independently of an operating system (OS) of the first VM, the remote access to a micro-controller operating system (micro OS) of a display device using the IP stream, wherein the IP stream is decoded by the micro OS, and an element of the IP stream is routed to a second virtual machine (VM) via the second VM's VM channel for presentation to a user via the display device, wherein the second VM facilitates services and is part of a VM pool which is separate and/or distinct from the first VM,
    wherein interpolation of the IP stream is directly compatible with a component signal generated locally at the display device such that signals provided by the display device appear indistinguishable from those of a locally connected device.

2. The method of claim 1, further comprising providing the remote access via the second VM's VM channel and a 5G connection to the display device.

3. The method of claim 1, further comprising receiving information from the display device in response to providing the remote access to the display device.

4. The method of claim 1, further comprising providing the remote access to the display device independently of a non-micro OS of the display device.

5. The method of claim 1, further comprising sending the IP stream to the micro OS of the display device.

6. A controller comprising a processing resource in communication with a memory resource including instructions executable to:
   convert output from components of a first virtual machine (VM) to an Internet protocol (IP) stream using a virtual device driver of the first VM;
   provide the converted output to a micro-controller operating system (micro OS) of a display device using the IP stream,
   wherein the IP stream is decoded by the micro OS, and an element of the IP stream routed to a second virtual machine (VM) via the second VM's VM channel for presentation to a user via the display device, wherein the second VM facilitates services and is part of a VM pool which is separate and/or distinct from the first VM, and wherein interpolation of the IP stream is directly compatible with a component signal generated locally at the display device such that signals provided by the display device appear indistinguishable from those of a locally connected device; and
   display to a display device the converted output using the virtual device driver.

7. The controller of claim 6, further comprising instructions executable to convert Universal Serial Bus (USB) output associated with the first VM to the IP stream using the virtual device driver.

8. The controller of claim 6, further comprising instructions executable to convert sensor output associated with the first VM to the IP stream using the virtual device driver.

9. The controller of claim 6, wherein the instructions are executable to communicate the IP stream via the second VM's VM channel.

10. The controller of claim 6, wherein the instructions are executable to display the converted output independent of an operating system (OS) associated with the first VM.

11. A controller comprising a processing resource in communication with a memory resource including instructions executable to:
   convert output from a first virtual machine (VM) driver associated with a first operating system (OS) to an IP stream using a first virtual device driver;
   convert output from a second VM driver associated with a second OS to the IP stream using the second virtual device driver; and
   provide the converted output from the first VM and from the second VM to a micro-controller operating system (micro OS) of a display device, simultaneously and independently of the first and the second OSes, the converted first and second outputs using the first and the second virtual device drivers,
   wherein the IP stream is decoded by the micro OS, and an element of the IP stream is routed to a third virtual machine (VM) via the third VM's VM channel for presentation to a user via the display device, wherein the third VM facilitates services and is part of a VM pool which is separate and/or distinct from the first and second VMs; and
   wherein interpolation of the IP stream is directly compatible with a component signal generated locally at the display device such that signals provided by the display device appear indistinguishable from those of a locally connected device.

12. The controller of claim 11, further comprising instructions executable to display the converted first and second outputs using the first and the second virtual device drivers independently of an OS associated with the display device.

13. The controller of claim 11, further comprising instructions executable to provide remote access of the controller to the display device using the IP stream.

14. The controller of claim 11, further comprising the instructions executable to provide the remote access to an additional VM located on the display device.

15. The controller of claim 11, further comprising instructions executable to compress the IP stream based on a condition of an associated 5G network.

* * * * *